United States Patent
Tarradas et al.

(10) Patent No.: US 10,960,606 B2
(45) Date of Patent: *Mar. 30, 2021

(54) CONTROLLING HEATING IN ADDITIVE MANUFACTURING

(71) Applicant: HEWLETT-PACKARD DEVELOPMENT COMPANY, L.P., Houston, TX (US)

(72) Inventors: Anna Tarradas, Sant Cugat del Valles (ES); Xavier Vilajosana, Sant Cugat del Valles (ES); Diego Javier Mostaccio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/097,266

(22) PCT Filed: Jul. 22, 2016

(86) PCT No.: PCT/US2016/043517
§ 371 (c)(1),
(2) Date: Oct. 28, 2018

(87) PCT Pub. No.: WO2018/017116
PCT Pub. Date: Jan. 25, 2018

(65) Prior Publication Data
US 2019/0111630 A1    Apr. 18, 2019

(51) Int. Cl.
*B29C 64/393* (2017.01)
*B33Y 10/00* (2015.01)
(Continued)

(52) U.S. Cl.
CPC ............ *B29C 64/393* (2017.08); *B22F 3/008* (2013.01); *B28B 1/001* (2013.01);
(Continued)

(58) Field of Classification Search
CPC . B29C 64/393; B29C 35/0288; B29C 64/295; B29C 64/165; B33Y 10/00;
(Continued)

(56) References Cited

U.S. PATENT DOCUMENTS

| 7,296,990 B2 | 11/2007 | Devos et al. |
| 10,632,672 B2* | 4/2020 | Vilajosana ............. B33Y 10/00 |
| 2015/0314528 A1 | 11/2015 | Gordon |
| 2016/0059482 A1 | 3/2016 | Hakkaku et al. |

(Continued)

FOREIGN PATENT DOCUMENTS

| CN | 105172143 A | 12/2015 |
| EP | 2572865 A1 | 3/2013 |

(Continued)

OTHER PUBLICATIONS

International Search Report and Written Opinion for International Application No. PCT/US2016/043517, dated Mar. 30, 2017, 7 pages.

*Primary Examiner* — Nahida Sultana
(74) *Attorney, Agent, or Firm* — HP Inc. Patent Department (57) ABSTRACT

According to some examples, a method comprises measuring, using a detector, a temperature of at least a portion of a layer of build material formed on a print bed associated with an additive manufacturing apparatus. The additive manufacturing apparatus may include a heating module to direct heat towards successive layers of build material during a series of successive passes over the build material. The method may further comprise determining, using a processor, based at least in part on the measured temperature, a duration that the heating module is to wait before performing a pass over the build material, and a speed at which the heating module is to travel over the build material.

15 Claims, 4 Drawing Sheets

(51) Int. Cl.
*B33Y 30/00* (2015.01)
*B33Y 50/02* (2015.01)
*B29C 64/295* (2017.01)
*B29C 35/02* (2006.01)
*B22F 3/00* (2021.01)
*B28B 1/00* (2006.01)
*B28B 17/00* (2006.01)

(52) U.S. Cl.
CPC ...... *B28B 17/0081* (2013.01); *B29C 35/0288* (2013.01); *B29C 64/295* (2017.08); *B33Y 10/00* (2014.12); *B33Y 30/00* (2014.12); *B33Y 50/02* (2014.12)

(58) Field of Classification Search
CPC ......... B33Y 50/02; B33Y 30/00; B22F 3/008; B28B 1/001; B28B 17/0081
See application file for complete search history.

(56) References Cited

U.S. PATENT DOCUMENTS

| | | | | |
|---|---|---|---|---|
| 2017/0239719 | A1* | 8/2017 | Buller | B22F 3/1055 |
| 2019/0061282 | A1* | 2/2019 | Johnson | B29C 70/384 |
| 2019/0099954 | A1* | 4/2019 | Vilajosana | B29C 64/165 |
| 2019/0134754 | A1* | 5/2019 | Jacquemetton | B23K 31/125 |
| 2019/0263066 | A1* | 8/2019 | Nystrom | B29C 64/393 |
| 2020/0041974 | A1* | 2/2020 | Acharya | B22F 3/1055 |
| 2020/0156151 | A1* | 5/2020 | Suzuki | B22F 3/1055 |
| 2020/0247110 | A1* | 8/2020 | Heiles | G01N 25/72 |
| 2020/0282497 | A1* | 9/2020 | Yamasaki | B29C 64/386 |
| 2020/0376772 | A1* | 12/2020 | Poelsma | B29C 64/236 |

FOREIGN PATENT DOCUMENTS

| | | |
|---|---|---|
| GB | 2532470 A | 5/2016 |
| WO | WO-2008075450 | 6/2008 |
| WO | WO-2016048348 | 3/2016 |

* cited by examiner

CONTROLLING HEATING IN ADDITIVE MANUFACTURING

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In some examples, the temperature of the build material is increased prior to the melting process.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
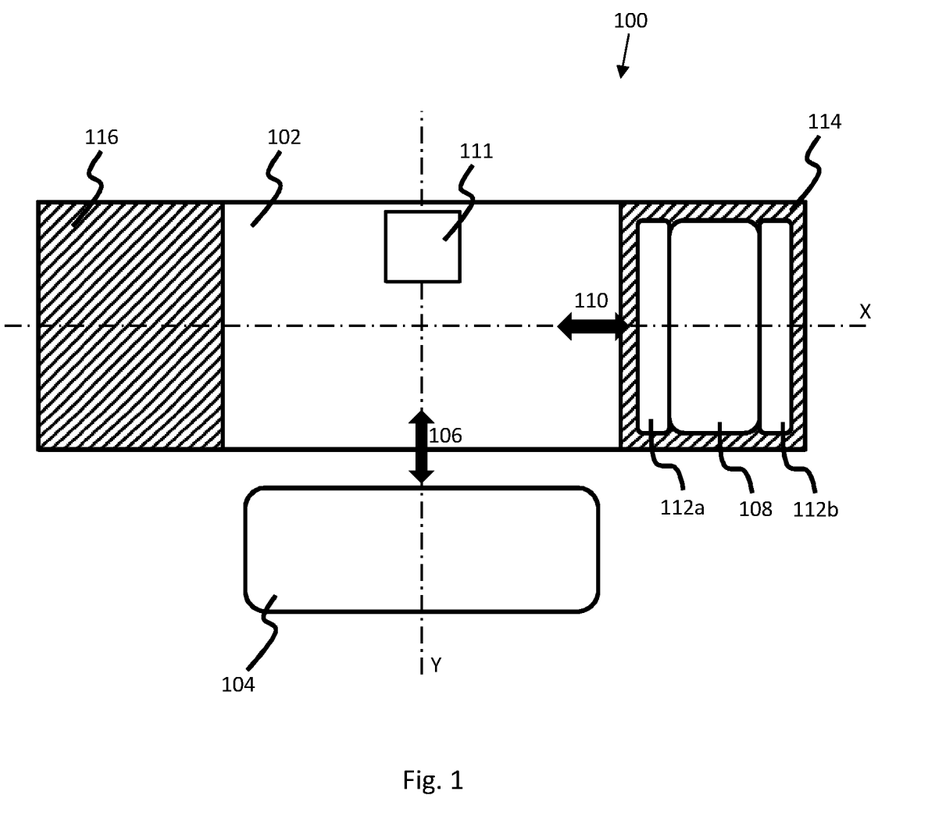
FIG. 1 is a simplified schematic of an example of components of an additive manufacturing apparatus.
Figure 2:
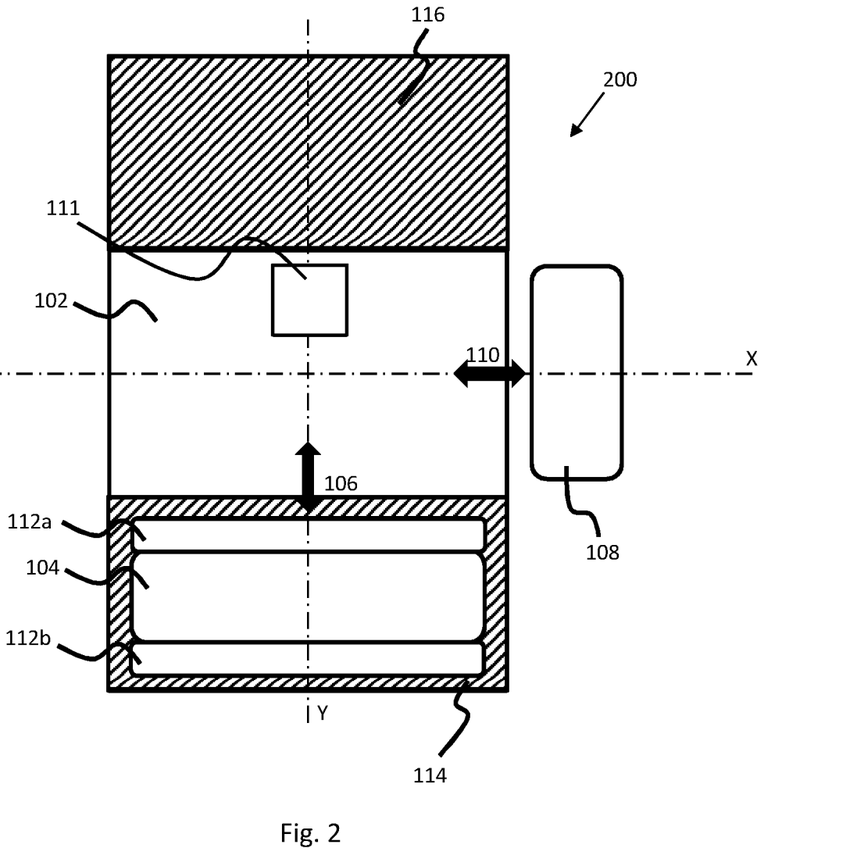
FIG. 2 is a simplified schematic of a further example of components of an additive manufacturing apparatus.

FIGS. 1 and 2 are simplified schematic views of examples of different arrangements of components in an additive manufacturing apparatus.

FIG. 1 shows, schematically, a plan view of components of an apparatus 100. The apparatus 100 may, in some examples, form part of an additive manufacturing apparatus. The apparatus 100 may include a print bed, or print area, 102 upon which layers of build material may be formed on a layer-by-layer basis. The print bed 102 may be located within a fabrication chamber, and each layer of build material may be processed as is discussed below, such that a three dimensional object can be generated in the fabrication chamber. In some examples, the print bed 102 or the fabrication chamber including the print bed may form part of a unit which can be removably incorporated into an additive manufacturing apparatus.

In the example shown in FIG. 1, a build material coater, or distributor, 104 may move over the print bed 102 along an axis labelled Y in the directions of arrow 106. The build material distributor 104 may move along a track (not shown), controlled by processing apparatus (not shown), and may distribute build material evenly in layers of a defined thickness. The apparatus 100 may also include a print agent distributor 108 which may move over the print bed 102 along an axis labelled X in the directions of arrow 110. In some examples, the print agent distributor 108 may form part of a carriage capable of moving over the print bed 102. The print agent distributor 108 may move along a track (not shown), controlled by processing apparatus (not shown), and may selectively deliver print agent, such as fusing agent and/or detailing agent, to portions of each layer of build material formed on the print bed 102. The apparatus 100 may also include a detector 111 for measuring a temperature of at least a portion of the print bed 102 or at least a portion of a layer of build material formed on the print bed.

In this example, a heating module 112 is coupled to or forms part of the print agent distributor 108. The heating module 112, which may be integrated with the print agent distributor 108 or may be coupled thereto, include a plurality of heating elements, such as heating lamps, to direct heat towards the print bed 102 and towards layer of build material formed on the print bed. In the example shown in FIG. 1, the heating elements of the heating module 112 are arranged in two portions—a first portion 112a and a second portion 112b, formed on opposite sides of the print agent distributor 108 or carriage. In some examples, fewer or more heating modules may be included, and the heating modules may be arranged in any suitable manner with respect to the print agent distributor 108. As the print agent distributor 108 passes over the print bed 102, the heating module 112 may direct heat towards build material in order to increase the temperature of the build material. As the print agent distributor 108 performs a first pass over the print bed 102 and build material, for example along the axis X towards the left-hand side of FIG. 1, it may deliver the print agent through a plurality of nozzles (not shown) in a defined pattern based on a slice of the three dimensional object to be generated. The print agent distributor 108 may then perform a second pass over the print bed 102 and build material, for example along the axis X towards the right-hand side of FIG. 1. During the second pass, the print agent distributor 108 may not deliver any print agent to the build material, but the heating module 112 may continue to direct heat towards the build material, to further increase the temperature of the entire layer of build material. During the second pass, the temperature of the build material to which print agent has been applied may be increased to such a temperature that those portions are caused to fuse. In other words, during the first pass over the build material, the heating module 112 serves to increase the temperature of the build material to which print agent has been applied to a first temperature which is below the temperature at which the print agent-treated build material is caused to fuse and, during the second pass over the build material, the heating module 112 serves to increase the temperature of the build material to which print agent has been applied to a second temperature which is above the temperature at which the print agent-treated build material is caused to fuse.

The processes of distributing a layer of build material onto the print bed, then, during a first pass of the print agent distributor 108 and heating module 112, delivering print agent and heat to the build material, and during a second pass, delivering heat but no print agent to the build material, can be considered to be part of a processing cycle, which may be repeated for each layer of build material.

When the print agent distributor 108 is not passing over the print bed 102, it may remain positioned at either end of the print bed, in one of waiting areas, or zones 114 (where the print agent distributor is shown to be positioned in FIG. 1) and 116. While in one of the waiting zones 114, 116, the print agent distributor 108 may be stationary, or continue to move. In general, however, when the print agent distributor 108 is positioned in one of the waiting zones 114, 116, the heating module 112 is not directly above the print bed 102 and, therefore, heat from the heating modules is at least substantially prevented from reaching the build material on the print bed. In some examples, the apparatus 100 may include a heat barrier or guard (not shown) to prevent heat from the heating module 112 from reaching the build material while the heating module is in a waiting zone 114, 116. In some examples, the apparatus 100 may include a buffer zone between each waiting zone 114, 116 and the print bed 102 to reduce the amount of heat able to reach the build material while the heating module 112 is in a waiting zone.

Reference is now made to FIG. 2, which shows, schematically, a plan view of components in an apparatus 200, which is similar to the apparatus 100 of FIG. 1. In FIG. 2, however, the heating module 112 is coupled to or forms part of the build material distributor 104, rather than the print agent distributor 108. In this example, the heating module 112 directs heat to the build material while the build material distributor 104 performs a first pass over the print bed 102, for example along the axis Y towards the top of FIG. 2, to distribute a layer of build material onto the print bed, or onto a previously-formed layer of build material. The print agent distributor 108 may then perform a pass over the print bed 102 to distribute print agent to portions of the layer of build material. The build material distributor 104 may then perform a second pass over the print bed 102, for example along the axis Y towards the bottom of FIG. 2, during which the heating module 112 may continue to direct heat towards the build material, to further increase the temperature of the build material.

When the build material distributor 104 is not passing over the print bed 102, it may remain positioned at either end of the print bed, in one of waiting zones 114 (where the build material distributor is shown to be positioned in FIG. 2) and 116. While in one of the waiting zones 114, 116, the build material distributor 104 may be stationary, or continue to move. In general, however, when the build material distributor 104 is positioned in one of the waiting zones 114, 116, the heating module 112 is not directly above the print bed 102 and, therefore, heat from the heating module is at least substantially prevented from reaching the build material on the print bed. As with the example shown in FIG. 1, the apparatus 100 may, in some examples, include a heat barrier or guard (not shown) to prevent heat from the heating module 112 from reaching the build material while the heating module is in a waiting zone 114, 116. In some examples, the additive manufacturing apparatus 200 may include a buffer zone between each waiting zone 114, 116 and the print bed 102.

In summary, therefore, the heating module 112 may be located on the build material distributor 104 or on the print agent distributor 108, both of which may pass over each layer of build material. In other examples, the heating module 112 may be located elsewhere in relation to the additive manufacturing apparatus and may, for example, move over the print bed 102 along its own track, separate from and independent of the build material distributor 104 and the print agent distributor 108.

As discussed above, a first pass of the heating module 112 over the build material serves to increase the temperature of the build material to which fusing agent has been applied to a temperature that is below its fusing temperature (i.e. the temperature at which build material to which fusing agent has been applied is caused to fuse or coalesce), while the second pass of the heating module over the build material serves to further increase the temperature of the build material to which fusing agent has been applied to a temperature that is above its fusing temperature. As noted above, in some examples, the heating elements of the heating module 112 may remain on for the duration of an additive manufacturing process, and may emit heat at a constant power during the process. Therefore, the amount of heat from the heating module 112 that reaches the build material will depend on a number of factors, including, for example, the speed at which the heating module travels over the build material.

By keeping the heating elements on constantly and at a constant power, the heating elements are not repeatedly powered up and down, and occurrences of current peaks in the heating module are few.

FIG. 3 is a flowchart of an example of a method for controlling heating in an additive manufacturing apparatus such as the apparatus 100, 200 discussed above with reference to FIGS. 2 and 3.

Figure 3:
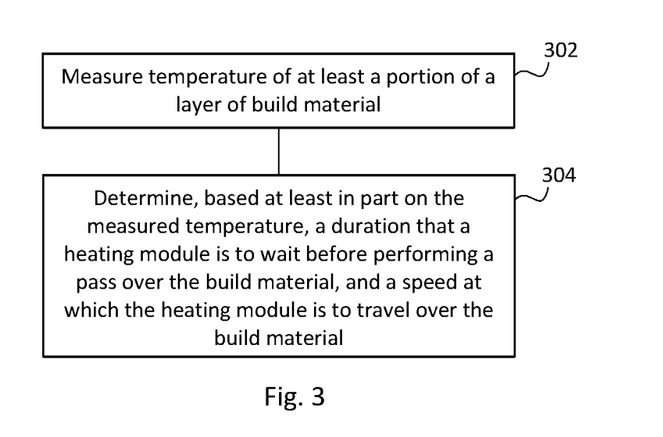
FIG. 3 is a flowchart of an example of a method of controlling heating in an additive manufacturing system.

The method of FIG. 3 comprises, at block 302, measuring, using a detector, a temperature of at least a portion of a layer of build material formed on print bed associated with an additive manufacturing apparatus, the additive manufacturing apparatus including a heating module to direct heat towards successive layers of build material during a series of successive passes over the build material. The additive manufacturing apparatus may be the apparatus 100, 200 discussed above, and the heating module may comprise a single heating module, or a plurality of portions of heating modules including the portions 112a, 112b discussed above.

The additive manufacturing apparatus may comprise a detector, such as the detector 111, capable of measuring a temperature of at least a portion of a layer of build material on the print bed 102 or on a previously-formed layer of build material. In some examples, the detector may comprise an infrared thermopile array, and the detector may be controlled by processing apparatus, such as a processor, within, associated with or remote from the additive manufacturing apparatus. An output from the detector may be delivered to a processing apparatus. The detector may comprise an array of sensors capable of measuring temperatures of build material across the print bed 102 in real time.

The method may further comprise, at block 304, determining, using a processor, based at least in part on the measured temperature, a duration that the heating module is to wait before performing a pass over the build material, and a speed at which the heating module is to travel over the build material. The measured temperature provides an indication of how close the temperature of the print agent-treated build material is as a result of a first pass of the heating module 112 to an intended temperature. For example, it may be intended that, from the first pass of the heating module 112, the temperature of the print agent-treated build material is increased from, say, 150 degrees Celsius (which may be temperature at which build material is distributed) to 170 degrees Celsius. In one example, the fusing temperature of build material to which fusing agent has been applied (for example by the print agent distributor 108) may be 180 degrees Celsius. Therefore, it may be intended to increase the temperature of the print agent-treated build material to over 180 degrees Celsius—for example 185 degrees Celsius—to ensure that fusing takes place. Thus, a further temperature increase of 10 to 15 degrees Celsius may be intended in order to cause the print agent-treated build material to fuse, or coalesce.

In some examples, a further temperature increase of the print agent-treated build material may be achieved by controlling the heating module 112 to pass over the build material at a particular speed. For example, if the heating module 112 were to travel too fast during the second pass, then it may be that not enough heat energy would reach the build material from the heating module 112, and the temperature might not increase by the intended amount. In contrast, if the heating module 112 were to move at too slow a pace, then too much heat energy from the heating module might reach the build material, resulting in the temperature of the print agent-treated build material increasing too much, and exceeding the intended temperature.

In other examples, the speed at which the heating module 112 is to move may be kept constant, but the power output of the heating module might be increased or decreased accordingly in order to increase or decrease the amount of energy that is delivered to the layer of build material during the second pass. In some other examples, both the speed at which the heating module 112 is to move and the power output of the heating module may be varied or selected to that an intended amount of energy may be delivered to a layer of build material.

In some examples, the heating module 112 may cause an even increase in temperature of the entire layer of build material which has been distributed by the build material distributor 104 on the print bed 102 or on an existing layer of build material. However, those portions of build material to which fusing agent has been applied may absorb a greater amount of heat energy from the heating module 112 and, therefore, the temperature of those portions of build material may be caused to increase beyond the temperature of the portions of build material to which no fusing agent has been applied. In some examples, other factors may cause the temperature of some portions of a layer of build material to increase more than others. For example, light-coloured (for example, white) build material absorbs less energy than relatively darker (for example non-while) build material and, therefore, the temperature of portions of non-white build material may increase more than portions of white build material.

Thus, the temperature increase of the build material to which fusing agent has been applied can be controlled by controlling the speed at which the heating module 112 is to travel as it moves over the print bed 102, and the speed at which the heating module is to travel may be calculated based on the measured temperature. In addition, however, the temperature increase of the print agent-treated build material may be controlled by controlling the time between the first pass and the second pass of the heating module 112 over the print bed 102. In some examples, the heating module 112 may be stopped, controlled to remain stationary, or controlled to continue to move, for example at a relatively slower speed in a position not directly above the print bed 102 and build material, during the period between the first and second passes. For example, the heating module 112 may be controlled to remain positioned in one of the waiting zones 114, 116 between successive passes. In these waiting zones, the heating module 112 may be held, with the heating elements continuing to emit heat energy, without the heat energy reaching the build material and further increasing its temperature. Thus, by holding the heating module 112 in one of the waiting zones, the temperature of the build material is allowed to reduce. By allowing the temperature of the build material to reduce by moving the heating module 112 to a waiting zone 114, 116 rather than by preventing heating in some other manner, for example by switching off heating elements in the heating module, the possibility of flicker in the heating elements may be reduced. Furthermore, since the heating module 112 may be kept on at a constant power while in the waiting zone 114, 116, control circuitry used to control the heating module may be simplified, and the heating module may be kept at an optimum temperature, so frequent adjustments to the power supplied to the heating module may be avoided.

In some examples, if the temperature of the print agent-treated build material as measured by the detector after a first pass of the heating module 112 is higher than intended (for example, if it is determined that a second pass of the heating module would result in the temperature of the print agent-treated build material increasing to above the intended temperature) then the heating module may be caused to wait in one of the waiting zones 114, 116 before performing a second pass over the print bed 102. As is discussed in greater detail below, the duration that the heating module 112 is to wait in one of the waiting zones 114, 116 may be determined by processing apparatus associated with the detector and the heating module.

In one example, if, following the first pass of the heating module 112 over the print bed 102, the measured temperature is such that a large amount of additional heat energy is to be applied in order to increase the temperature of the print agent-treated build material to the target temperature, then the heating module may be controlled to not to wait before performing its next pass, and may be controlled to move at a relatively slow speed over the build material, so that a relatively greater amount of heat energy is transferred to the build material to increase the temperature to the target temperature.

Figure 4:
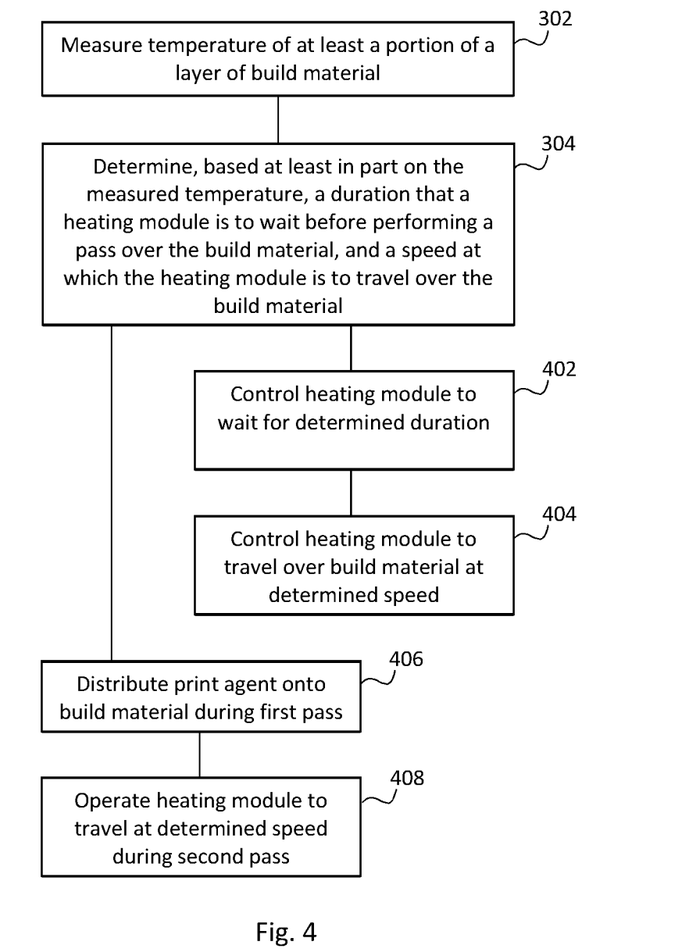
FIG. 4 is a flowchart of a further example of a method of controlling heating in an additive manufacturing system.

FIG. 4 is a flowchart of a further example of a method for controlling heating in an additive manufacturing apparatus. The flowchart of FIG. 4 includes the blocks of FIG. 3 and some additional blocks.

At block 402, the method may further comprise controlling the heating module 112 to wait for the determined duration. In some examples, it may be determined that the heating module is not to wait (for example if it is not intended for the temperature of the build material to be decreased between passes) and therefore, the determined duration may be zero.

The method may comprise, a block 404, controlling the heating module 112 to travel over the build material at the determined speed. If it is determined that the heating module 112 is not to wait in one of the waiting zones 114, 116 between passes, then it may be controlled, in some examples, to perform the second pass at the determined speed (block 402) without waiting for a determined duration (block 402).

At block 406, the method may comprise distributing, during a first pass over a layer the build material, print agent onto at least a portion of the build material. The method may further comprise, at block 408, operating the heating module 112 to travel at the determined speed during a second pass over the build material. In some examples, during the first pass, the heating module 112 may increase a temperature of the build material to a first temperature and, during the second pass, the heating module may increase the temperature of build material to which print agent has been applied to a second, higher temperature.

Thus, following a first pass, in which the print agent distributor 108 may selectively distribute print agent onto portions of a layer of build material, temperatures of portions of the layer of build material may be measured by the detector, and processing apparatus associated with the detector and the heating module 112 may determine, based on the measured temperature, a speed at which the heating module is to travel in order to increase the temperature of the print agent-treated build material to the intended temperature (i.e. above the fusing temperature), and operate the heating module to move at the determined speed.

In some examples, for all of the passes during which print agent is to be distributed onto at least a portion of build material, the speed at which the heating module is to travel is constant. While distributing print agent onto the build material, the print agent distributor 108 moves at a constant speed so that the distribution of print agent is even and so that the resolution of the pattern in which the print agent is delivered is constant and as intended. Thus, if the heating module 112 is coupled to, or forms part of, the print agent distributor 108, then, for each pass during which print agent is distributed, the heating module moves at a constant speed over the print bed 102.

The determination of the combination of waiting time and the speed of movement of the heating module 112 may be made using processing apparatus associated with the additive manufacturing apparatus. The determination may be based on at least one of: (i) a difference between the measured temperature and a target temperature; (ii) a temperature of at least a portion of a layer of build material as measured prior to a preceding pass over the build material; (iii) a determined rate of change of a temperature of build material over successive passes; and (iv) a volume of a three-dimensional object to be generated by processing the successive layers of build material.

The difference between the measured temperature and the target temperature provides an indication of the amount of additional heat to be applied in order for the temperature of the print agent-treated build material to reach the target temperature. The temperature of at least a portion of a layer of build material as measured prior to a preceding pass over the build material may provide an indication of how the temperature has changed since the previously-formed layer of build material was formed, and an indication of how residual heat from the previously-formed layer may affect the temperature of a current layer. The determined rate of change of a temperature of build material over successive passes may provide an indication of how quickly the temperature is approaching the target temperature as a consequence of additional layers of build material being formed. The volume of a three-dimensional object to be generated by processing the successive layers of build material may provide an indication of the size of the object to be generated and, therefore, the amount of heat that will be retained in the various layers of build material as they are formed.

More specifically, according to some examples, the duration that the heating module 112 is to wait in a waiting zone 114, 116 before performing its next pass over the print bed may be represented by a proportional-integral-derivative (PID)-type system. A controller used in such a system—a PID controller—provides a control loop feedback mechanism which continuously calculates an error value as a difference between an intended value (i.e. the intended temperature) and a measured variable (i.e. the measured temperature). The controller attempts to minimize the error over time by adjustment of a control variable which, in the examples discussed herein, is the temperature of the build material. The waiting time (which is equivalent to the output of the controller) is calculated based on temperatures measured over time.

According to some examples, a series of successive temperature measurements may be taken for a particular layer of build material, and the wait time may be determined using the following expression:

$$\text{Wait Time} = [K_p \times A_t] + [K_i \times \Sigma(T_{1 \ldots N-1})] + [K_d \times (T_N - T_{N-1})/dt] + [K_w \times (\text{area})]$$

In the above expression, $K_p$ is a proportional gain; $K_i$ is an integral gain; $K_d$ is a derivative gain; $A_t$ represents the difference in temperature between the measured temperature and the target (intended) temperature; $\Sigma(T_{1 \ldots N-1})$ represents an accumulation (a summation) of all previous calculated differences between the measured temperatures and the target temperatures for the layer, which provides an indication of the temperature change 'inertia' of the object being generated, based on the how the temperature of the build material has previously changed; $(T_N - T_{N-1})/dt$ represents the rate at which the difference between the measured temperature and the target temperature is reducing, where $T_N$ is the current temperature difference, $T_{N-1}$ is the previously-measured temperature difference, and $dt$ is the time between the two measurements; $K_w$ is a gain relating to the area of the object to be generated; and '(area)' is the area of the layer of build material to be fused (a relatively larger area of build material may retain a greater amount of heat than a relatively smaller area of build material). The measured temperatures in the above expression may be averages of temperatures measured at various points across the layer of build material.

Thus, the above expression may be used to calculate a waiting time for the heating module 112 between passes over the print bed 102. Since the detector measures the temperature of the build material constantly, or takes rapid regular measurements, the determination of the wait time and the speed at which the heating module 112 is to travel may be made while the heating module is moving over the print bed 102, or after it has passed over the print bed, as it slows down.

In some examples, weighting factors may be applied to at least one of the terms in the above expression such that, for example, a determination of the waiting time may be made using a subset of the terms in the above expression, and a determination may, in some examples, be made using any one of the terms. A more optimal waiting time may be determined when a greater number of terms is used to calculate the waiting time. In some examples, temperatures measured by the detector may be input into a temperature feedback system which may determine, based on the measured temperatures, the amount of energy that is to be delivered to the built material in order to fuse those portions to which print agent has been applied. In such an example, a wait time may not be determined.

Figure 5:
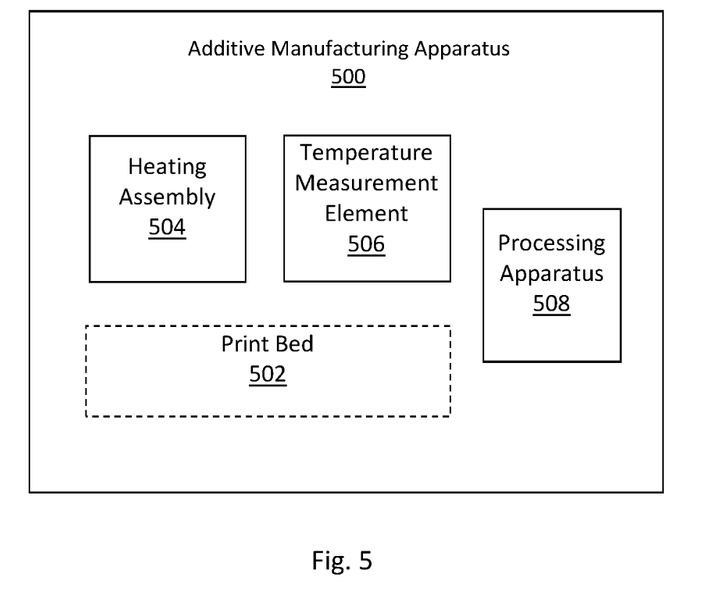
FIG. 5 is a simplified schematic of an example of components of apparatus for controlling heating in an additive manufacturing system.

An example additive manufacturing apparatus 500 is shown in FIG. 5. The additive manufacturing apparatus 500 comprises a heating assembly 504 to direct heat towards layers of build material formed on a print bed associated with the additive manufacturing apparatus during a series of passes over the print bed; a temperature measurement element 506 to determine a temperature of at least a portion of a layer of build material; and processing apparatus 508. The processing apparatus 508 may calculate, based at least in part on the determined temperature, an amount of time that the heating assembly 504 is to wait between a first pass over the print bed 502 and a second pass over the print bed, and a rate of movement of the heating assembly during the second pass. In some examples, the additive manufacturing apparatus 500 may comprise a print bed 502 on which the layers of build material can be processed to generate a three-dimensional object. The print bed may form part of a separate unit which can be removably incorporated into the additive manufacturing apparatus 500. The non-essentiality of the print bed 502 is denoted by the dashed line in FIG. 5.

The additive manufacturing apparatus 500 may comprise the apparatus 100 or 200 discussed above with reference to FIGS. 1 and 2, the print bed 502 may comprise the print bed 102 discussed above, the heating assembly 504 may comprise the heating module 112 discussed above, and the temperature measurement element 506 may comprise the detector discussed above.

According to some examples, the heating assembly 504 may form part of, or be coupled to, a carriage for moving a print agent distributor, the print agent distributor to selectively deliver print agent to at least a portion of a layer of build material. According other examples, the heating assembly 504 may form part of, or be coupled to, a carriage for moving a build material distributor, the build material distributor to distribute layers of build material over the print bed. In other examples, portions of the heating assembly 504 may form part of, or be coupled to both the print agent distributor and the build material distributor and, in other examples, the heating assembly may be separate from both the print agent distributor and the build material distributor, and may move independently of the print agent distributor and the build material distributor, for example along a heating assembly track.

In some examples, the heating assembly 504 may comprise a plurality of heating elements. During a pass over the build material, a power output of the each of the heating elements may remain constant.

The processing apparatus may, in some examples, operate the heating assembly 504 to wait for the calculated amount of time; and operate the heating assembly to pass over the print bed at the calculated rate. The heating assembly 504 may, for example, be controlled to wait in a waiting zone, such as the waiting zones 114, 116 discussed above.

Figure 6:
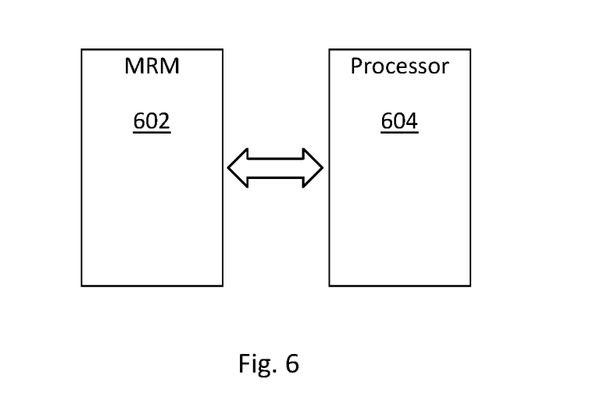
FIG. 6 is a simplified schematic of an example machine-readable medium with a processor to perform a method of controlling heating in an additive manufacturing system.

FIG. 6 shows a machine-readable medium 602 associated with a processor 604. The machine-readable medium 602 comprises instructions which, when executed by the processor 604, cause the processor to control a lamp assembly to pass over each of a plurality of layers of build material formed on a print bed of an additive manufacturing apparatus so as to direct heat towards each layer of build material; establish, based at least in part on a measured temperature of at least a portion of a layer of the build material: a duration that the lamp assembly is to wait before beginning to pass over a layer of build material; and a speed at which the lamp assembly is to travel over the build material. The instructions, when executed by the processor 604 may also cause the processor to control the lamp assembly to wait for the established duration; and control the lamp assembly to perform a pass over the build material at the established speed.

The lamp assembly may comprise the heating assembly 504 or the heating module 112, and may include a plurality of heating elements, for example in an array.

In some examples, the machine-readable medium 602 may comprise instructions which, when executed by the processor 604, cause the processor to control the lamp assembly to wait for the established duration and/or control the lamp assembly to travel over the build material at the established speed.

The processor 604 may be associated with the additive manufacturing apparatus, or may form part of a remote computing device.

The processes and processing functions discussed herein may, in some examples, each be performed by a separate processor or processing apparatus. In other examples, the processes may be performed by a single processor or processing apparatus, or may be shared among a plurality of processors.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   during a first pass over a layer of build material formed on a print bed associated with an additive manufacturing apparatus, distributing print agent onto a portion of the build material and directing heat towards all of the build material using a heating module;
   following the first pass over the layer of build material, measuring, using a detector, a temperature of the portion of build material to which the print agent has been applied; and
   determining, using a processor, based at least in part on the measured temperature, a duration that the heating module is to wait before performing a second pass over the build material, and a speed at which the heating module is to travel over the build material during the second pass.

2. The method of claim 1, further comprising:
   controlling the heating module to wait for the determined duration before performing the second pass.

3. The method of claim 1, further comprising:
   controlling the heating module to travel over the build material at the determined speed during the second pass.

4. The method of claim 1, wherein, determining the duration is based on at least one of:
   i) a difference between the measured temperature and a target temperature;
   ii) a temperature of at least a portion of a layer of build material as measured prior to a preceding pass over the build material;
   iii) a determined rate of change of a temperature of build material over successive passes; and
   iv) a volume of a three-dimensional object to be generated by processing the successive layers of build material.

5. The method of claim 1, further comprising:
   operating the heating module to travel at the determined speed during the second pass over the build material.

6. The method of claim 5, wherein, during the first pass, the heating module is to increase a temperature of the build material to which print agent has been applied to a first temperature below a fusing temperature of the build material and, during the second pass, the heating module is to increase the temperature of build material to which print agent has been applied to a second, higher temperature above the fusing temperature of the build material.

7. The method of claim 5, wherein, for all passes over a layer of build material formed on the print bed during which print agent is to be distributed onto a portion of build material, the speed at which the heating module is to travel is constant.

8. Additive manufacturing apparatus comprising:
   a heating assembly to direct heat towards all of the build material in layers of build material formed on a print bed associated with the additive manufacturing apparatus during a series of passes over the print bed;
   a temperature measurement element to determine a temperature of a portion of build material to which print agent has been applied during a first pass over the print bed; and
   processing apparatus to calculate, based at least in part on the determined temperature:
   an amount of time that the heating assembly is to wait between the first pass over the print bed and a second pass over the print bed; and
   a rate of movement of the heating assembly during the second pass.

9. Additive manufacturing apparatus according to claim 8, wherein the heating assembly forms part of, or is coupled to, a carriage for moving a print agent distributor, the print agent distributor to selectively deliver print agent during the first pass over the print bed to the portion of build material.

10. Additive manufacturing apparatus according to claim 8, wherein the heating assembly forms part of, or is coupled to, a carriage for moving a build material distributor, the build material distributor to distribute layers of build material over the print bed.

11. Additive manufacturing apparatus according to claim 8, wherein the heating assembly comprises a plurality of heating elements, and wherein, during a pass over the build material, a power output of the each of the heating elements remains constant.

12. Additive manufacturing apparatus according to claim 8, wherein the processing apparatus is to:
  operate the heating assembly to wait for the calculated amount of time; and
  operate the heating assembly to pass over the print bed at the calculated rate.

13. A machine readable medium comprising instructions which, when executed by a processor, cause the processor to:
  control a lamp assembly to pass over for a first time, each of a plurality of layers of build material formed on a print bed of an additive manufacturing apparatus so as to direct heat towards all of the build material in each layer of build material;
  establish, based at least in part on a measured temperature of at least a portion of a layer of the build material to which a print agent has been applied:
    a duration that the lamp assembly is to wait before beginning to pass over a layer of build material for a second time; and
    a speed at which the lamp assembly is to travel over the build material during the second time.

14. A machine readable medium according to claim 13, further comprising instructions which, when executed by a processor, cause the processor to:
  control the lamp assembly to wait for the established duration before passing over a layer of build material for the second time.

15. A machine readable medium according to claim 13, further comprising instructions which, when executed by a processor, cause the processor to:
  control the lamp assembly to travel over the build material during the second time at the established speed.

* * * * *